United States Patent
Wei et al.

(10) Patent No.: US 7,830,036 B2
(45) Date of Patent: Nov. 9, 2010

(54) POWER ELECTRONIC MODULE PRE-CHARGE SYSTEM AND METHOD

(75) Inventors: Lixiang Wei, Whitefish Bay, WI (US); Richard A Lukaszewski, New Berlin, WI (US); Ajith H Wijenayake, New Berlin, WI (US); Paul Krause, Fredonia, WI (US); Michael Loth, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 219 days.

(21) Appl. No.: 12/241,617

(22) Filed: Sep. 30, 2008

(65) Prior Publication Data
US 2010/0078998 A1    Apr. 1, 2010

(51) Int. Cl.
*H02J 1/14* (2006.01)
(52) U.S. Cl. ........................................... 307/31
(58) Field of Classification Search .................. 307/21, 307/22, 24, 25, 26, 31; 365/203
See application file for complete search history.

(56) References Cited

U.S. PATENT DOCUMENTS

| | | | | |
|---|---|---|---|---|
| 5,216,586 | A * | 6/1993 | Saito | 363/49 |
| 5,418,706 | A * | 5/1995 | Havas et al. | 363/57 |
| 5,804,973 | A * | 9/1998 | Shinohara et al. | 324/548 |
| 7,276,888 | B2 * | 10/2007 | Thiele et al. | 323/282 |
| 7,468,565 | B2 * | 12/2008 | Hoshiba | 307/10.1 |
| 7,479,746 | B2 * | 1/2009 | Rozman et al. | 318/98 |

* cited by examiner

*Primary Examiner*—Albert W Paladini
(74) *Attorney, Agent, or Firm*—Fletcher Yoder LLP; Alexander R. Kuszewski; John M. Miller

(57) ABSTRACT

A power electronics device with an improved pre-charge circuit configuration is provided. More specifically, the input of the motor drive module may accept an AC or DC source voltage. In this way, the pre-charge circuit of the motor drive module may be utilized whether the motor drive is coupled to an AC or DC source.

27 Claims, 7 Drawing Sheets

POWER ELECTRONIC MODULE PRE-CHARGE SYSTEM AND METHOD

BACKGROUND

The invention relates generally to the field of power electronic devices such as those used in power conversion or applying power to motors and similar loads. More particularly, the invention relates to an improved system and method of utilizing a pre-charge circuit in an inverter module such as a motor drive.

In the field of power electronic devices, a wide range of circuitry is known and currently available for converting, producing and applying power to loads. Depending upon the application, such circuitry may convert incoming power from one form to another as needed by the load. In a typical motor control, for example, a rectifier converts alternating current (AC) power (such as from a utility grid or generator) to direct current (DC) power. Inverter circuitry can then convert the DC signal into an AC signal of a particular frequency desired for driving a motor at a particular speed. The inverter circuitry typically includes several high power switches, such as insulated-gate bipolar transistors (IGBTs), controlled by drive circuitry. Often, power conditioning circuits, such as capacitors and/or inductors, are employed to remove unwanted voltage ripple on the internal DC bus.

Often, at the first application of AC power to the motor drive circuit detailed above, the circuit will draw high levels of current due to the charging of the power conditioning capacitors. Therefore, to avoid a high in-rush current at start-up, a typical motor drive may also include a pre-charge circuit, which applies a smaller initial current to the DC bus just prior to start-up to charge the capacitors before a full source voltage is applied.

Typically, the motor drive circuitry detailed above, including the pre-charge circuit, may be packaged together as a motor drive module. To reduce manufacturing costs, motor drive modules are mass produced and are, therefore, available in the form of standardized product lines. Often, this means that the capabilities of the motor drive may not be fully utilized, depending on the particular application. For example, it may be desirable in a particular power control network to couple several motor drives to a common DC source. In this example, the common DC source may be coupled directly to the local DC bus of the motor drive module, by-passing the rectifier and the pre-charge circuit, which will, therefore, go unused. It may also be desirable, however, to include an operable pre-charge circuit for each individual motor drive, in which case additional pre-charge circuits may need to be added to the power control network, because the existing pre-charge circuit of the motor drive may not be accessible due to the wiring of the common DC source to the local DC bus. This added pre-charge circuitry adds cost to the overall design of the power control network.

Therefore, it may be advantageous to provide an inverter module that is more adaptable. In particular, it may be advantageous to provide an inverter module with an improved method for utilizing the pre-charge circuit in various modes of operation.

BRIEF DESCRIPTION

Embodiments of the present invention relate generally to systems and methods for powering multiple inverter modules designed to address such needs. For example, embodiments of the present invention include an inverter module powered by a DC source wherein a high voltage side of the DC source is coupled to at least one of the rectifier inputs so that the pre-charge circuit may be utilized.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
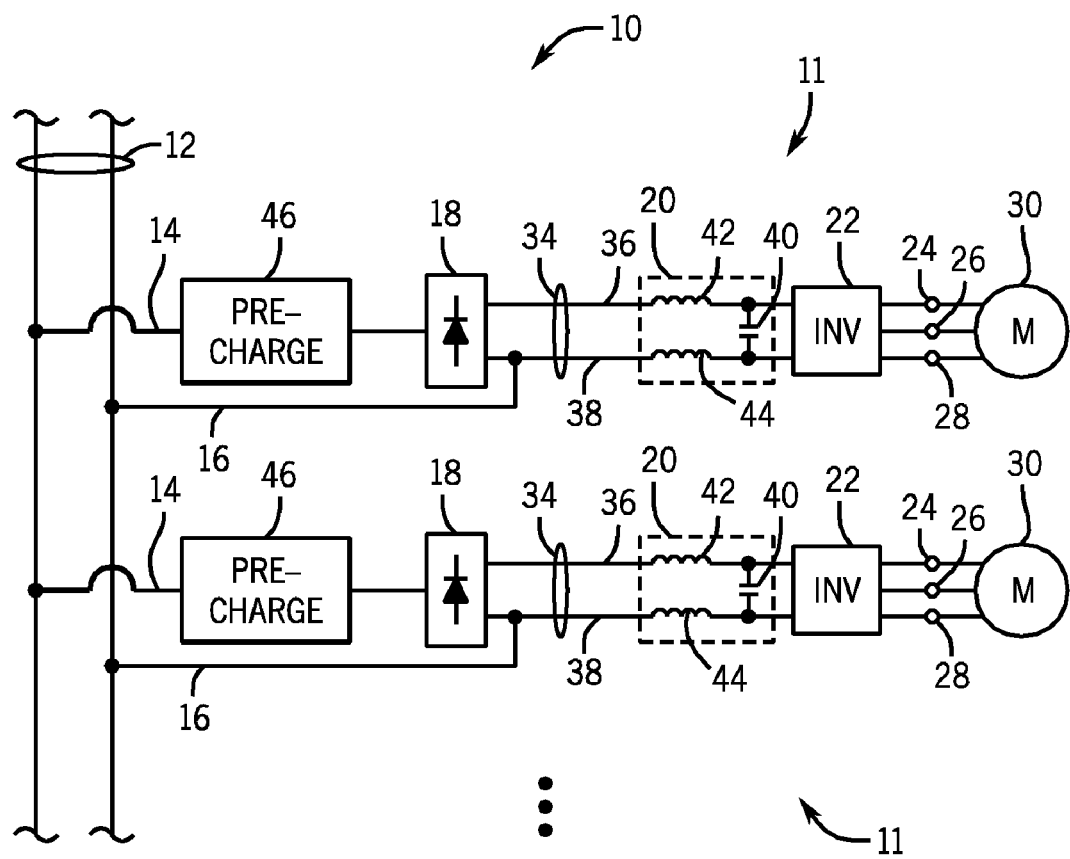
FIG. 1 is a diagrammatical representation of an exemplary power distribution network in accordance with an embodiment of the present invention.

FIG. 1 is a diagrammatical representation of an exemplary power distribution network 10 in accordance with an embodiment of the present invention. The power distribution network 10 may include one or more motor drives 11 coupled to a DC bus 12 through a high side 14 and low side 16. As shown in FIG. 1, the DC bus 12 may provide power to several motor drives 11. It should be noted, however, that in some embodiments the DC bus 12 may be dedicated to a single motor drive 11. Furthermore, the DC bus 12 may be powered by any DC source known in the art, such as a battery, a solar panel, or a rectified AC source. In some embodiments the DC bus 12 may be powered by an 18-pulse, active front-end rectifier.

Although the motor drive 11 is coupled to a DC bus 12, the motor drive 11 may, nevertheless, include a rectifier 18 and power conditioning circuitry 20. The rectifier 18 and power conditioning circuitry 20 provide the motor drive 11 with greater versatility by allowing the user the option of coupling the motor drive 11 to an AC source if desired. The motor drive 11 may also include an inverter 22 that generates a three phase output waveform at a desired frequency for driving a motor 30 connected to the output terminals 24, 26 and 28.

The rectifier 18, power conditioning circuitry 20, and inverter 22 are coupled together though a local DC bus 34, which includes a high side 36 and a low side 38. The power conditioning circuitry 20 may include a high-side inductor 42 coupled to the high side 36 of the DC bus 34 and a low-side inductor 44 coupled to the low side 38 of the DC bus 34, both of which may act as a choke for smoothing the received DC voltage waveform. A capacitor 40 links the high side 36 of the DC bus 34 with the low side 38 of the DC bus 34 and is also configured to smooth the rectified DC voltage waveform. Together, the capacitor 40 and the inductors 42 and 44 serve to remove most of the AC ripple presented by the DC bus 12 so that the DC bus 34 carries a waveform closely approximating a true DC voltage. In the embodiment shown in FIG. 1, the inductors 42 and 44 may also serve to provide more even distribution of power throughout the power distribution network 10.

Also included in the motor drive 11 is a pre-charge circuit 46, which serves to reduce the in-rush current that may otherwise occur when power is first applied to the motor drive. As will be appreciated by those of ordinary skill in the art, a high in-rush current can be caused, in part, by the capacitor 40, which will briefly behave like a short-circuit after voltage is applied to the local DC bus 34 and before the capacitor has stored sufficient charge. Generally, the pre-charge circuit 46 may reduce in-rush current by controlling an initial charging current to the capacitor 40 during an initial charging stage in which the capacitor 40 charges to the approximate bus voltage before the rectifier 18 becomes active. As will be discussed below, the pre-charge circuit may be any pre-charge circuit known in the art. For example, in some embodiments the pre-charge circuit may also be coupled to the local DC bus 34, between the rectifier 18 and the inverter 22.

Typically, when a motor drive is coupled to a common DC bus, the common DC bus may be coupled directly to the local DC bus 34, bypassing both the rectifier 18 and the pre-charge circuit 46. In embodiments of the present invention, however, the DC bus 12 may be coupled to the input of the rectifier 18 to make better use of the circuitry included in the motor drive 11, such as the pre-charge circuit 46 and the choke inductors 42 and 44. In this way, unlike the typical configuration, the existing pre-charge circuit 46 inside the motor drive 11 can be utilized, which may eliminate the added cost of installing additional pre-charge circuits to the power distribution network 10. Additionally, the choke inductors 42 and 44 may also be utilized, which may improve the DC ripple and current sharing between motor drives 11. However, for some cases where inductor 42 and 44 may not be needed, they can be taken out of the circuit by shorting two terminals of 42 and the two terminals of 44 respectively. In this case, the pre-charge circuit is still functioning in the circuit.

FIGS. 2-7 are diagrammatical representations of exemplary motor drive modules that employ a variety of pre-charge circuit configurations, and wherein the DC bus 12 is coupled to the input of the rectifier 18 in accordance with embodiments of the present invention. It should be noted that the embodiments depicted are only a few examples of possible embodiments of the present invention.

Figure 2:
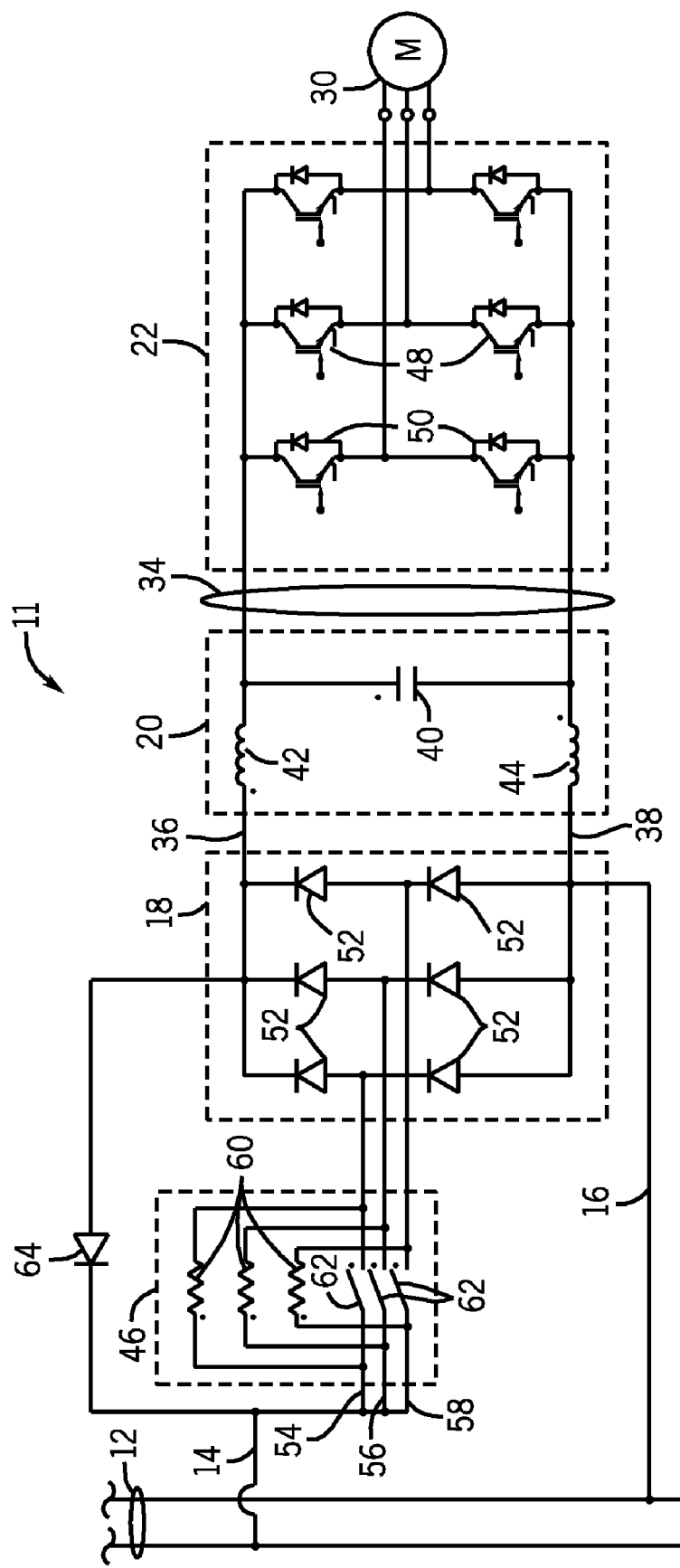
FIGS. 2-7 are diagrammatical representations of exemplary motor drive modules in accordance with various embodiments of the present invention.

Turning to FIG. 2, an exemplary motor drive module in accordance with one embodiment of the present invention is depicted. The motor drive 11 may include an inverter 22, which will generally include a set of solid state switches 48, such as power MOSFETS or insulated gate bipolar junction transistors (IGBTs), for example. Specifically, two switches 48 may be coupled in series, collector to emitter, between the high side 36 and low side 38 of the DC bus 34. Three of these switch pairs are then coupled in parallel to the DC bus 34, for a total of six switches 48. Each switch 48 may be paired with a flyback diode 50 such that the collector is coupled to the anode and the emitter is coupled to the cathode. Each of the output terminals 24, 26 and 28 may be coupled to one of the switch outputs between one of the pairs of switches 48. Furthermore, driver circuitry (not shown) may be coupled to each of the switches to create a three-phase output waveform. The desired output waveform may be generated through pulse width modulation, wherein the drive circuitry causes the switches 48 to switch rapidly on and off in a particular sequence so as to create an approximately sinusoidal output waveform.

The motor drive 11 may also include a set of input terminals 54, 56 and 58 that are coupled to the rectifier 18 through the pre-charge circuit 46. Although, in the embodiment depicted, the pre-charge circuit 46 and rectifier 18 are both coupled to a DC bus 12, the pre-charge circuit 46 and rectifier 18 are also capable of receiving three-phase AC power through the input terminals 54, 56 and 58. Therefore, the rectifier circuitry 18 includes a set of six diodes 52 that are capable of providing full wave rectification of a three phase voltage waveform. Each input terminal 54, 56 and 58 entering the rectifier circuitry 18 is coupled between two diodes 52 arranged in series, anode to cathode, which span from the low side 38 of the local DC bus 34 to the high side 36 of the local DC bus 34. It should be noted that the three-phase configuration described herein is not intended to be limiting, and the invention may be employed on single-phase circuitry, as well as on circuitry designed for applications other than motor drives.

Although the pre-charge circuit 46 and rectifier 18 are both capable of receiving AC power, the motor drive 11 may be coupled to a DC bus 12. However, in order to utilize the pre-charge circuit 46, the DC bus 12 may, nevertheless, be coupled to the same inputs that would also receive three-phase AC power. In certain embodiments, the high side 14 of the DC bus 12 may be coupled to the input terminals 54, 56 and 58 of the pre-charge circuit 46. Each of the input terminals 54, 56, and 58 may be coupled to a pre-charge resistor 60 in parallel with a switch 62. Switch 62 may be a solid state switch, an automatic relay, a manual switch, such as a three-pole switch, or any other switch known in the art.

The low side 16 of the DC bus may be coupled directly to the low side 38 of the local DC bus 34. Although the low side 16 is depicted in FIG. 2 as being coupled upstream from the low side inductor 44, in some embodiments the low side 16 of the DC bus 12 may be coupled downstream from the low side inductor 44, in which case the low side inductor 44 will carry little or no current, and will be effectively removed from the circuit. In this way, the level of the choke inductance provided by the power conditioning circuitry 20 may be adjusted. Similarly, for cases in which inductor 42 and 44 may not be needed, they can also be taken out of the circuit by shorting the two terminals of inductor 42 and the two terminals of inductor 44 respectively. In this case, the pre-charge circuit is still functioning in the circuit.

During the pre-charge stage the switches 62 are open, such that all of the current delivered to the motor drive 11 will flow through the pre-charge resistors 60. In this way, the current draw on the DC bus 12 is limited to an acceptable value known in the art, while the capacitor 40 charges. After a suitable time period has elapsed, the switches 62 may be closed and the pre-charge resistors 60 bypassed, thereby automatically disconnecting the pre-charge resistors 60 from the motor drive 11. However, because the capacitor 40 will have been charged to the approximate bus voltage, excessive in-rush currents are avoided.

It should be noted that in some embodiments, the high side 14 of the DC bus 12 may be coupled to only one or two of the input terminals 54, 56 and 58, in which case the remaining uncoupled terminals may be left floating or, alternatively, coupled to the low side 16 of the bus 12. It should also be noted that in some embodiments, one or two of the input terminals 54, 56 and 58 may be coupled directly to the rectifier 18 without a switch 62 or a pre-charge resistor 60, in which case the remaining pre-charge resistor may be sufficient to limit the in-rush current during pre-charge.

Furthermore, it will be appreciated by one of ordinary skill in the art that in some circumstances the motor 30 may itself generate a reverse, or regenerative, current, such as when the motor 30 is powered down. In some embodiments, it may be desirable to feed this reverse current back to the DC bus 12. Therefore, in some embodiments, a diode 64 may be coupled between the high side 36 of the local bus 34 to the high side 14 of the DC bus 12, bypassing the rectifier 18 and the pre-charge circuit 46. In this way, a conductive path is provided for the reverse current. In embodiments in which a reverse current is not accommodated, the diode 64 may be eliminated.

Figure 3:
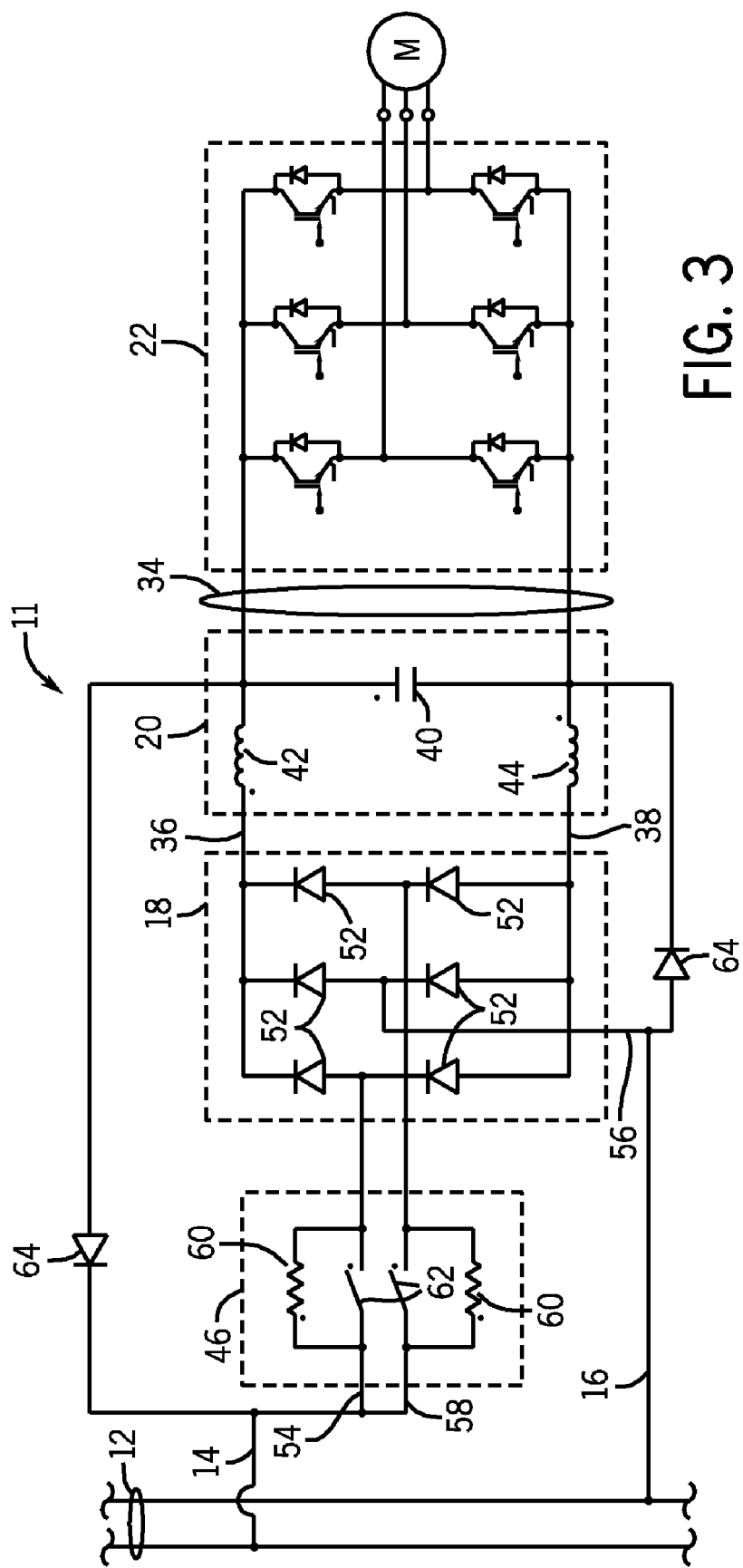

FIG. 3 is a diagrammatical representation of another exemplary motor drive similar to the one discussed in FIG. 2. In this embodiment, however, both the high side 14 and the low side 16 of the DC bus 12 are coupled to the input terminals 54, 56 and 58. Specifically, the high side 14 is coupled to input terminals 54 and 58, while the low side 16 is coupled to the input terminal 56. For clarification, it should be noted that the diodes 64 are optional and are provided to accommodate reverse current as described above. Therefore, the diode 64 that is coupled to the low side 38 of the local DC bus 12 will normally be reverse biased, except when conducting reverse current. Operation of the embodiment shown in FIG. 3 will be similar to the embodiment shown in FIG. 2. However, in the embodiment depicted in FIG. 3, the return current path includes the diode 52 that is coupled to the low side 16 of the DC bus 12 through the input terminal 56. In other embodiments, two of the input terminals 54, 56 and 58 may be coupled to the low side 16 of the DC bus 12, rather than one.

Figure 4:
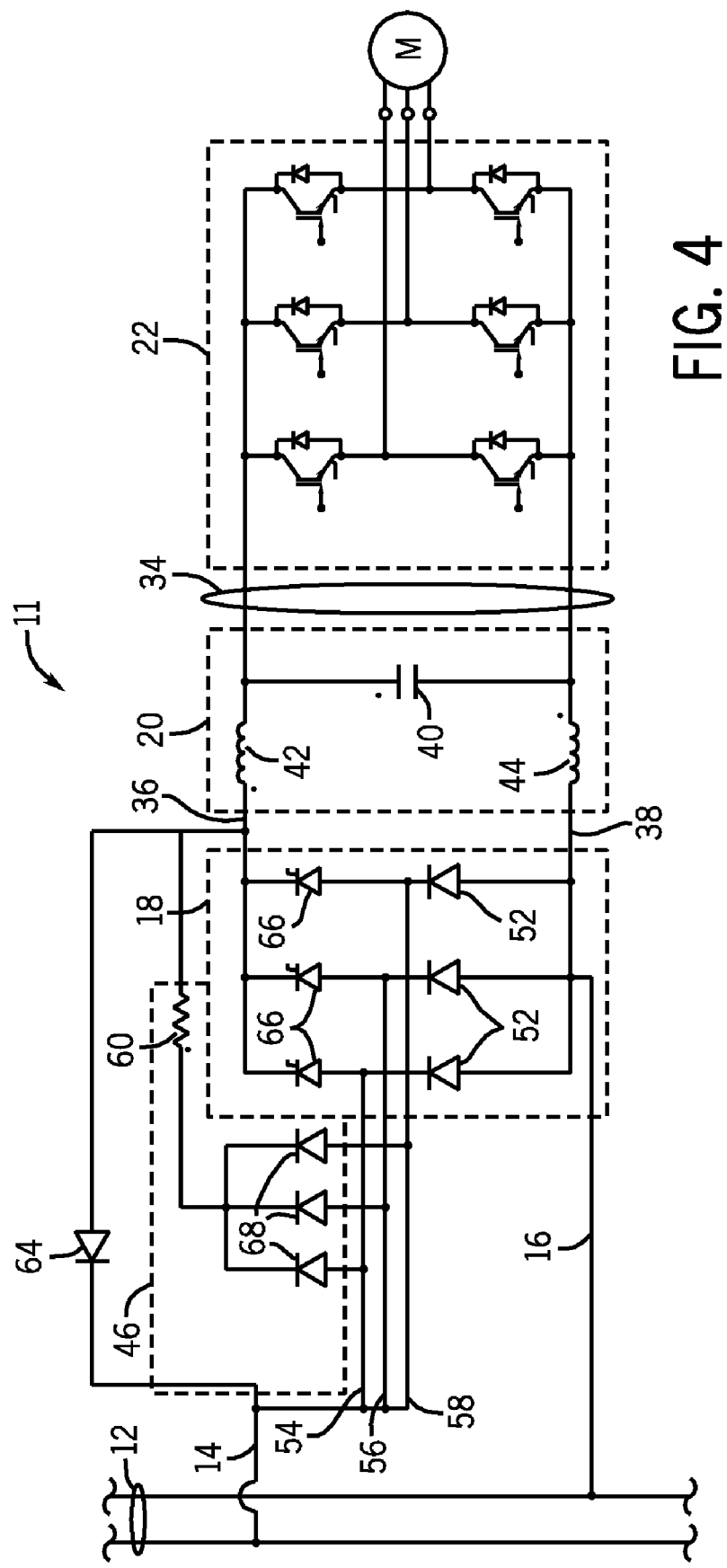

FIG. 4 is a diagrammatical representation of an exemplary motor drive in accordance with an embodiment that utilizes different pre-charge circuitry. In this embodiment, the rectifier 18 includes three diodes 52 and three thyristors 66 that are capable together of providing full wave rectification of a three phase voltage waveform. The anodes of the three diodes are coupled to the low side 38 of the local DC bus 34, and the cathodes of the three thyristors are coupled to the high side 36 of the local DC bus 34. Each input terminal 54, 56 and 58 entering the rectifier circuitry 18 is coupled between a diode 52 and a thyristor 66 arranged in series, anode to cathode, which span from the low side 38 of the local DC bus 34 to the high side 36 of the local DC bus 34. The pre-charge circuit 46 couples the input terminals 54, 56, and 58 to the high side 36 of the local DC bus 34 through a pre-charge resistor 60. The pre-charge circuit 46 may include three diodes 68 coupled in parallel with the three thyristors 66 and in series with the common pre-charge resistor 60. The high side 14 of the DC bus 12 is coupled to the anodes of the diodes 68 and the thyristors 66 through the input terminals 54, 56, and 58.

As discussed above in the description of FIG. 2, the low side 16 of the DC bus 12 may be coupled directly to the low side 38 of the local DC bus 34, either upstream or downstream from the low side inductor 44. Additionally, in some embodiments, a diode 64 may be coupled between the high side 36 of the local bus 34 to the high side 14 of the DC bus 12, to accommodate reverse current. Furthermore, the high side 14 of the DC bus 12 may be coupled to only one or two of the input terminals 54, 56 and 58. For some cases where inductor 42 and 44 may not be needed, they can be taken out of the circuit by shorting the two terminals of inductor 42 and the two terminals of inductor 44 respectively. In this case, the pre-charge circuit is still functioning in the circuit.

During the pre-charge stage, the three thyristors 66 are deactivated. Therefore, current is delivered to the motor drive 11 through the diodes 68 and the pre-charge resistor 60. As discussed above, the pre-charge resistor 60 increases the overall resistance of the motor drive 11 during the pre-charge stage, such that excessive in-rush current is avoided. After the capacitor 40 has developed a sufficient charge, the thyristors 66 are switched on so that current may bypass the diodes 68 and the pre-charge resistor 60, thereby reducing the overall resistance of the motor drive 11.

Figure 5:
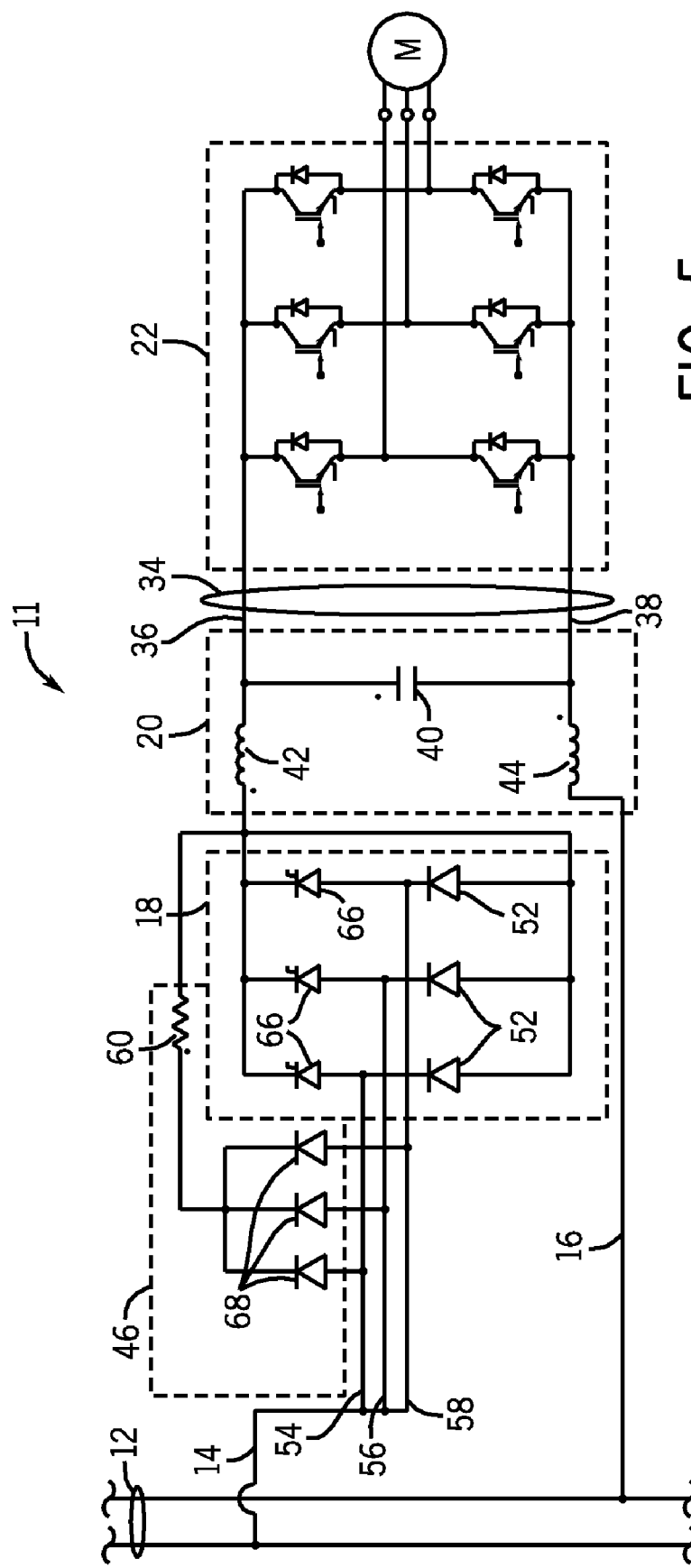

FIG. 5 is a diagrammatical representation of another exemplary motor drive similar to the one discussed in FIG. 4. In this embodiment, however, the anode sides of the diodes 52 are electrically coupled to the high side 36 of the local DC bus 34 rather than the low side 38 of the local DC bus 34. In this embodiment, reverse current may be accommodated without adding an additional diode 64 between the high side 14 of the DC bus and the high side 36 of the local DC bus 34, as shown in FIG. 4. Rather, in the embodiment shown in FIG. 4, reverse current may follow a path that includes the diodes 52. In other respects, the embodiment shown in FIG. 5 may operate similarly to the embodiment shown in FIG. 4. In addition, this technique may also be applied to the circuit described above in reference to FIG. 2. Referring briefly to FIG. 2, the three diodes 52 coupled to the low side 38 may instead be electrically coupled to high side 36, thus replacing the diode 64.

Figure 6:
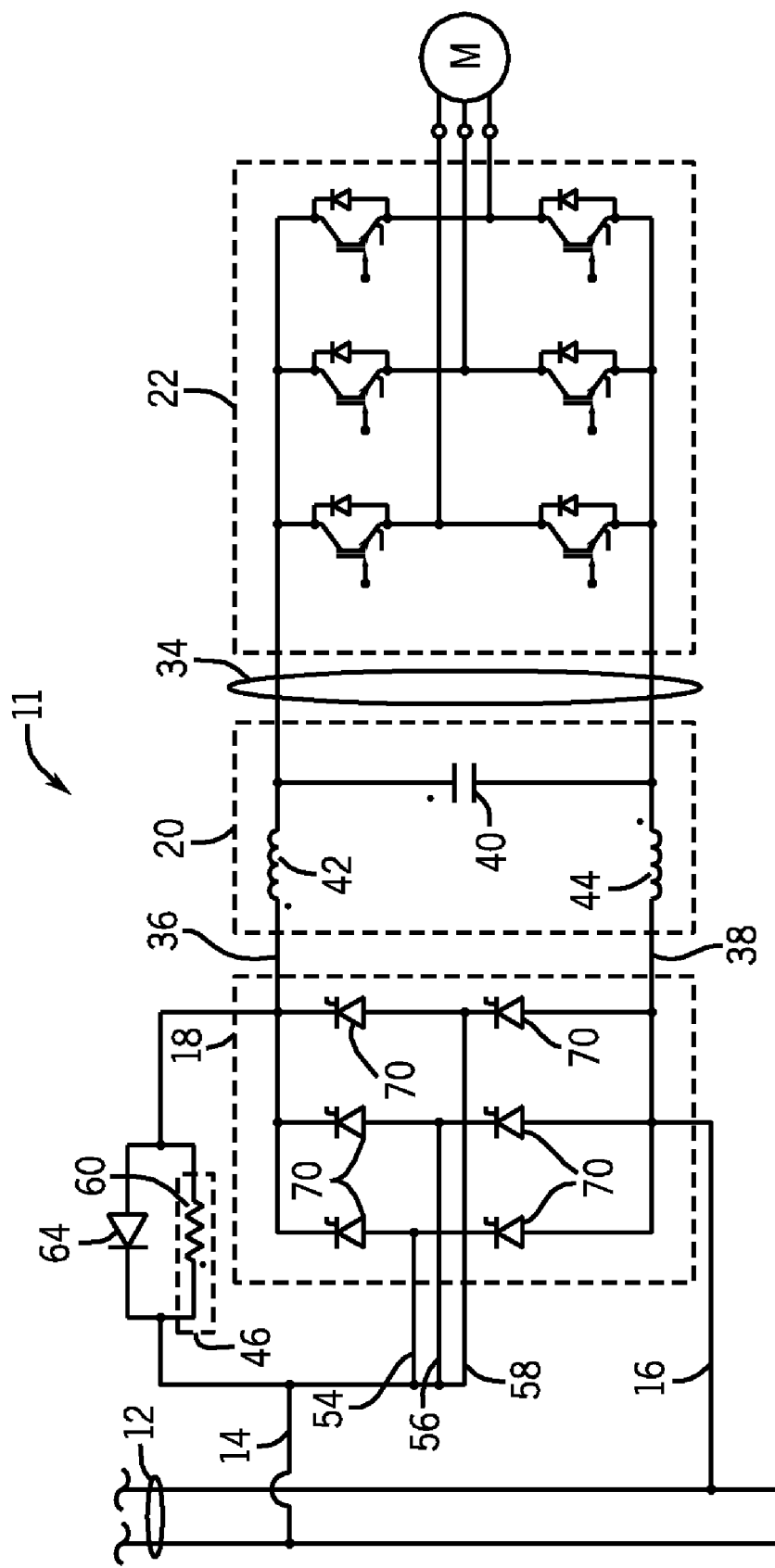

FIG. 6 is a diagrammatical representation of exemplary motor drive in accordance with an embodiment that utilizes yet another form of pre-charge circuitry. In this embodiment, the rectifier 18 includes six thyristors 70 that are capable together of providing full wave rectification of a three phase voltage waveform. Each input terminal 54, 56 and 58 entering the rectifier circuitry 18 is coupled between two thyristors 70 arranged in series, anode to cathode, which span from the low side 38 of the local DC bus 34 to the high side 36 of the local DC bus 34. The high side 14 of the DC bus 12 is coupled to the rectifier 18 through the input terminals 54, 56, and 58.

As discussed above in the description of FIG. 2, the low side 16 of the DC bus 12 may be coupled directly to the low side 38 of the local DC bus 34, either upstream or downstream from the low side inductor 44. For some cases where inductor 42 and 44 may not be needed, they can be taken out of the circuit by shorting two terminals of inductor 42 and the two terminals of inductor 44 respectively. In this case, the pre-charge circuit is still functioning in the circuit. Additionally, although the embodiment depicted in FIG. 6 is capable of accommodating a small amount of reverse current through the pre-charge resistor 60, in some embodiments, a diode 64 may be coupled in parallel to the pre-charge resistor 60 to provide a low resistance path for reverse current. Furthermore, as in the other embodiments discussed above, the high side 14 of the DC bus 12 may be coupled to only one or two of the input terminals 54, 56 and 58.

The pre-charge circuit 46 may include a pre-charge resistor 60 coupled between the high side 14 of the DC bus 12 and the high side 36 of the local DC bus 34. During the pre-charge stage, the six thyristors 70 are deactivated. Therefore, current is delivered to the motor drive 11 through the pre-charge resistor 60. As discussed above, the pre-charge resistor 60 increases the overall resistance of the motor drive 11 during the pre-charge stage, such that excessive in-rush current is avoided. After the capacitor 40 has developed a sufficient charge, the thyristors 70 are switched on so that current may bypass the pre-charge resistor 60, thereby reducing the overall resistance of the motor drive 11. Furthermore, as described above in reference to FIG. 5, reverse current may also be accommodated by electrically coupling the three thyristors 70 to the high side 36 of the bus 34, and the diode 64 may be eliminated. Under this mode, all six thyristors may be triggered at the same time to provide proper current flow in both directions.

Figure 7:
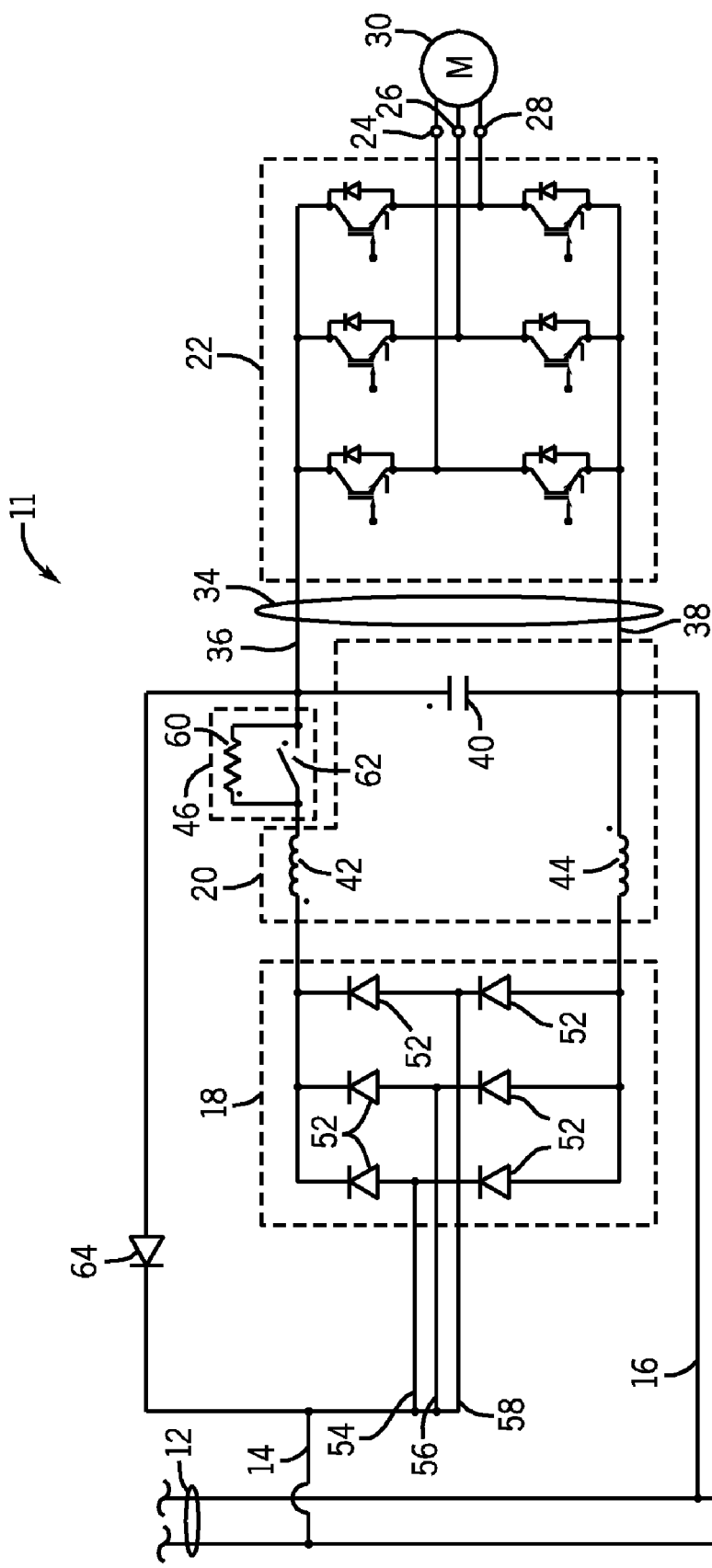

FIG. 7 is a diagrammatical representation of exemplary motor drive in accordance with an embodiment that utilizes yet another form of pre-charge circuitry. In this embodiment, the rectifier circuitry 18 includes a set of six diodes 52 that are capable of providing full wave rectification of a three phase voltage waveform. Each input terminal 54, 56 and 58 entering the rectifier circuitry 18 is coupled between two diodes 52 arranged in series, anode to cathode, which span from the low side 38 of the local DC bus 34 to the high side 36 of the local DC bus 34. The high side 14 of the DC bus 12 is coupled to the input terminals 54, 56 and 58.

As discussed above in the description of FIG. 2, the low side 16 of the DC bus 12 may be coupled directly to the low side 38 of the local DC bus 34, either upstream or downstream from the low side inductor 44. For some cases where inductor 42 and 44 may not be needed, they can be taken out of the circuit by shorting the two terminals of inductor 42 and the two terminals of inductor 44 respectively. In this case, the pre-charge circuit is still functioning in the circuit. Additionally, in some embodiments, a diode 64 may be coupled between the high side of the DC bus 12 and the high side 36 of the local DC bus 12 to accommodate reverse current. Furthermore, as described above in reference to FIG. 5, reverse current may also be accommodated by electrically coupling the three low side diodes 52 to the high side 36 of the bus 34, and the diode 64 may be eliminated.

The pre-charge circuit 46 may be coupled to the high side 36 of the local DC bus 34. In other embodiments, the pre-charge circuit may be coupled to the low side 38 of the local DC bus 34. The pre-charge circuit may include a pre-charge resistor 60 and a switch 62. During the pre-charge stage, the switch is open so that current is delivered to the motor drive 11 through the pre-charge resistor 60. As discussed above, the pre-charge resistor 60 increases the overall resistance of the motor drive 11 during the pre-charge stage, such that excessive in-rush current is avoided. After the capacitor 40 has developed a sufficient charge, the switch 62 is closed so that current may bypass the pre-charge resistor 60, thereby reducing the overall resistance of the motor drive 11.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for powering multiple loads comprising:
a common DC source; and
a plurality of inverter modules, each module including a rectifier circuit, and inverter circuit, an internal DC bus coupled between the rectifier circuit and the inverter circuit, a capacitive circuit coupled across the internal DC bus, and a pre-charge circuit configured to charge the capacitive circuit;
wherein the common DC source is coupled to the internal DC bus of each inverter module, and to at least one input to the rectifier circuit of each inverter module to power the respective pre-charge circuit of each inverter module.

2. The system of claim 1, wherein the pre-charge circuit comprises one or more switches in parallel with one or more respective pre-charge resistors and the pre-charge circuit is electrically coupled between the common DC source and the input of the rectifier circuit.

3. The system of claim 1, wherein the rectifier circuit comprises one or more thyristors configured to direct current through a pre-charge circuit, and wherein the pre-charge circuit comprises one or more pre-charge resistors coupled between the input of the rectifier circuit and a high voltage side of the internal DC bus.

4. The system of claim 3, wherein the pre-charge circuit further comprises one or more diodes in parallel with the one or more thyristors and in series with one or more pre-charge resistors.

5. The system of claim 1, wherein the rectifier comprises a plurality of diodes and wherein the plurality of diodes is decoupled from a low voltage side of the internal DC bus and coupled directly to a high voltage side of the internal DC bus.

6. The system of claim 1, wherein the rectifier comprises two or more directional current flow devices, and one or more of the two or more directional current flow devices is configured to conduct power from the common DC source to the internal DC bus, and one or more of the two or more directional current flow devices is configured to conduct power from the internal DC bus to the common DC source.

7. The system of claim 1, comprising one or more diodes coupled between the internal DC bus and the common DC source and in parallel with the rectifier and configured to conduct power from the internal DC bus to the common DC source.

8. The system of claim 1, wherein the pre-charge circuit comprises one or more switches in parallel with one or more pre-charge resistors and the pre-charge circuit is electrically coupled to the internal DC bus between the rectifier and the capacitive circuit.

9. The system of claim 1, wherein one side of the rectifier circuit is configured to be selectively coupled to either a high voltage side of the internal DC bus, for operating the device with DC input power, or a low voltage side of the internal DC bus for operating the device with AC input power.

10. A system for powering loads comprising:
an inverter module including a rectifier circuit, and inverter circuit, an internal DC bus coupled between the rectifier circuit and the inverter circuit, a capacitive circuit coupled across the internal DC bus, and a pre-charge circuit configured to charge the capacitive circuit;
wherein the internal DC bus of the inverter module is coupled to an external DC source, and at least one input to the rectifier circuit is coupled to the external DC source to power the pre-charge circuit.

11. The system of claim 10, wherein the pre-charge circuit comprises one or more switches in parallel with one or more respective pre-charge resistors and the pre-charge circuit is electrically coupled between the an external DC source and the input of the rectifier circuit.

12. The system of claim 10, wherein the rectifier circuit comprises one or more thyristors configured to direct current through a pre-charge circuit, and wherein the pre-charge circuit comprises one or more pre-charge resistors coupled between the input of the rectifier circuit and a high voltage side of the internal DC bus.

13. The system of claim 12, wherein the pre-charge circuit further comprises one or more diodes in parallel with the one or more thyristors and in series with one or more pre-charge resistors.

14. The system of claim 10, wherein the rectifier comprises a plurality of diodes and wherein the plurality of diodes is decoupled from a low voltage side of the internal DC bus and coupled directly to a high voltage side of the internal DC bus.

15. The system of claim 10, wherein the rectifier comprises two or more directional current flow devices, and one or more of the two or more directional current flow devices is configured to conduct power from the external DC source to the internal DC bus, and one or more of the two or more directional current flow devices is configured to conduct power from the internal DC bus to the external DC source.

16. The system of claim 10, comprising one or more diodes coupled between the internal DC bus and the external DC source and configured to conduct power from the internal DC bus to the external DC source.

17. The system of claim 10, wherein the pre-charge circuit comprises one or more switches in parallel with one or more pre-charge resistors and the pre-charge circuit is electrically coupled to the internal DC bus between the rectifier and the capacitive circuit.

18. The system of claim 10, wherein one side of the rectifier circuit is configured to be selectively coupled to either a high voltage side of the internal DC bus, for operating the device with DC input power, or a low voltage side of the internal DC bus for operating the device with AC input power.

19. A method for powering multiple loads comprising:
coupling a common DC source to a plurality of inverter modules, each module including a rectifier circuit, an inverter circuit, an internal DC bus coupled between the rectifier circuit and the inverter circuit, a capacitive circuit coupled across the internal DC bus, and a pre-charge circuit configured to charge the capacitive circuit;
wherein the common DC source is coupled to the internal DC bus of each inverter module, and to at least one input to the rectifier circuit of each inverter module to power the respective pre-charge circuit of each inverter module.

20. The method of claim 19, wherein the pre-charge circuit comprises one or more switches in parallel with one or more respective pre-charge resistors and the pre-charge circuit is electrically coupled between the common DC source and the input of the rectifier circuit.

21. The method of claim 19, wherein the rectifier circuit comprises one or more thyristors configured to direct current through a pre-charge circuit, and wherein the pre-charge circuit comprises one or more pre-charge resistors coupled between the input of the rectifier circuit and a high voltage side of the internal DC bus.

22. The method of claim 21, wherein the pre-charge circuit further comprises one or more diodes in parallel with the one or more thyristors and in series with one or more pre-charge resistors.

23. The method of claim 19, wherein the rectifier comprises a plurality of diodes and wherein the plurality of diodes is decoupled from a low voltage side of the internal DC bus and coupled directly to a high voltage side of the internal DC bus.

24. The method of claim 19, wherein the rectifier comprises two or more directional current flow devices, and one or more of the two or more directional current flow devices is configured to conduct power from the common DC source to the internal DC bus, and one or more of the two or more directional current flow devices is configured to conduct power from the internal DC bus to the common DC source.

25. The method of claim 19, comprising one or more diodes coupled between the internal DC bus and the common DC source and in parallel with the rectifier and configured to conduct power from the internal DC bus to the common DC source.

26. The method of claim 19, wherein the pre-charge circuit comprises one or more switches in parallel with one or more pre-charge resistors and the pre-charge circuit is electrically coupled to the internal DC bus between the rectifier and the capacitive circuit.

27. The method of claim 19, wherein one side of the rectifier circuit is configured to be selectively coupled to either a high voltage side of the internal DC bus, for operating the device with DC input power, or a low voltage side of the internal DC bus for operating the device with AC input power.

* * * * *